(12) United States Patent
Chochowski et al.

(10) Patent No.: US 10,402,500 B2
(45) Date of Patent: Sep. 3, 2019

(54) DEVICE AND METHOD FOR VOICE TRANSLATION

(71) Applicant: SAMSUNG ELECTRONICS CO., LTD., Suwon-si (KR)

(72) Inventors: Marcin Chochowski, Warsaw (PL); Pawel Przybysz, Wołomin (PL); Elzbieta Gajewska-Dendek, Łodź (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/427,665

(22) Filed: Feb. 8, 2017

(65) Prior Publication Data

US 2017/0286407 A1 Oct. 5, 2017

(30) Foreign Application Priority Data

Apr. 1, 2016 (KR) .................. 10-2016-0040201

(51) Int. Cl.
*G06F 17/28* (2006.01)
*G10L 15/00* (2013.01)
*G10L 15/04* (2013.01)
*G10L 21/10* (2013.01)
*G10L 15/26* (2006.01)

(52) U.S. Cl.
CPC .......... *G06F 17/289* (2013.01); *G10L 15/005* (2013.01); *G10L 15/04* (2013.01); *G10L 15/265* (2013.01); *G10L 21/10* (2013.01)

(58) Field of Classification Search
CPC ..... G06F 17/289; G10L 15/265; G10L 21/10; G10L 15/005; G10L 15/04
USPC .......................................................... 704/9
See application file for complete search history.

(56) References Cited

U.S. PATENT DOCUMENTS

| 5,689,616 | A | 11/1997 | Li |
| 5,895,447 | A | 4/1999 | Ittycheriah et al. |
| 6,088,669 | A | 7/2000 | Maes |
| 6,675,143 | B1 | 1/2004 | Barnes et al. |
| 6,952,674 | B2 | 10/2005 | Forand |
| 7,949,517 | B2 | 5/2011 | Eckert et al. |
| 8,762,151 | B2 * | 6/2014 | Correia .................. G10L 15/22 704/253 |

(Continued)

FOREIGN PATENT DOCUMENTS

JP          4087400 B2     5/2008

OTHER PUBLICATIONS

Pedro A. Torres-Carrasquillo et al., "Approaches to Language Identification using Gaussian Mixture Models and Shifted Delta Cepstral Features", in Interspeech, 2002, (pp. 89-92).
Najim Dehak et al., "Language Recognition via Ivectors and Dimensionality Reduction", ISCA, Interspeech 2011, Aug. 28-31, 2011, Florence, Italy, (pp. 857-860).
Luis Fernando D'Haro et al., "Phonotactic Language Recognition using i-vectors and Phoneme Posteriogram Counts", 2012, (4 Pages Total).

(Continued)

*Primary Examiner* — Bharatkumar S Shah
(74) *Attorney, Agent, or Firm* — Sughrue Mion, PLLC

(57) ABSTRACT

Provided are a method and electronic device for voice translation. The electronic device includes a voice receiver configured to receive a voice signal; a processor configured to divide the voice signal into a plurality of voice segments, determine an input language and a speaker that correspond to each of the plurality of voice segments, determine a translation direction based on the input language and the speaker of the voice segments, and translate the voice segments according to the translation direction to generate a translation result; and an output device configured to output the translation result.

14 Claims, 15 Drawing Sheets

(56) References Cited

U.S. PATENT DOCUMENTS

| | | | |
|---|---|---|---|
| 2006/0167677 A1* | 7/2006 | Bitzer | G06F 17/212 |
| | | | 704/9 |
| 2007/0061152 A1 | 3/2007 | Doi | |
| 2012/0010886 A1 | 1/2012 | Razavilar | |
| 2012/0232901 A1 | 9/2012 | Kadirkamanathan et al. | |
| 2013/0144595 A1 | 6/2013 | Lord et al. | |
| 2013/0311184 A1 | 11/2013 | Badavne et al. | |
| 2014/0156256 A1 | 6/2014 | Kim et al. | |
| 2014/0188455 A1 | 7/2014 | Manuselis et al. | |
| 2014/0365200 A1* | 12/2014 | Sagie | G06F 17/289 |
| | | | 704/2 |
| 2015/0051898 A1 | 2/2015 | Cuthbert et al. | |
| 2015/0112684 A1* | 4/2015 | Scheffer | G10L 17/14 |
| | | | 704/257 |
| 2015/0134320 A1* | 5/2015 | Rangarajan | G06F 17/2775 |
| | | | 704/2 |
| 2017/0262434 A1* | 9/2017 | Sumita | G06F 17/289 |

OTHER PUBLICATIONS

Douglas A. Reynolds, PhD., "Overview of Automatic Speaker Recognition", JHU 2008 Workshop Summer School, MIT Lincoln Laboratory, 2008 MIT, (pp. 1-44).

"Harvard Sentences", IEEE Transactions on Audio and Electroacoustics. vol. 17, 1969, (pp. 227-246, 19 Pages Total), http://www.cs.columbia.edu/~hgs/audio/harvard.html.

Javier Gonzalez-Dominguez et al., "A Real-Time End-to-End Multilingual Speech Recognition Architecture", Journal of Selected Topics in Signal Processing, Draft, IEEE Journal of Selected Topics in Signal Processing, 2015, v. 9, No. 4, (11 Pages Total) DOI: 10.1109/JSTSP.2014.2364559.

Haizhou Li et al., "Spoken Language Recognition: From Fundamentals to Practice", Proceedings of the IEEE, vol. 101, No. 5, May 2013, (pp. 1136-1159), DOI: 10.1109/JPROC.2012.2237151.

Najim Dehak et al., "Front-End Factor Analysis for Speaker Verification", IEEE Transactions on Audio, Speech and Language Processing, 2011, v. 19, No. 4, (12 Pages Total).

* cited by examiner

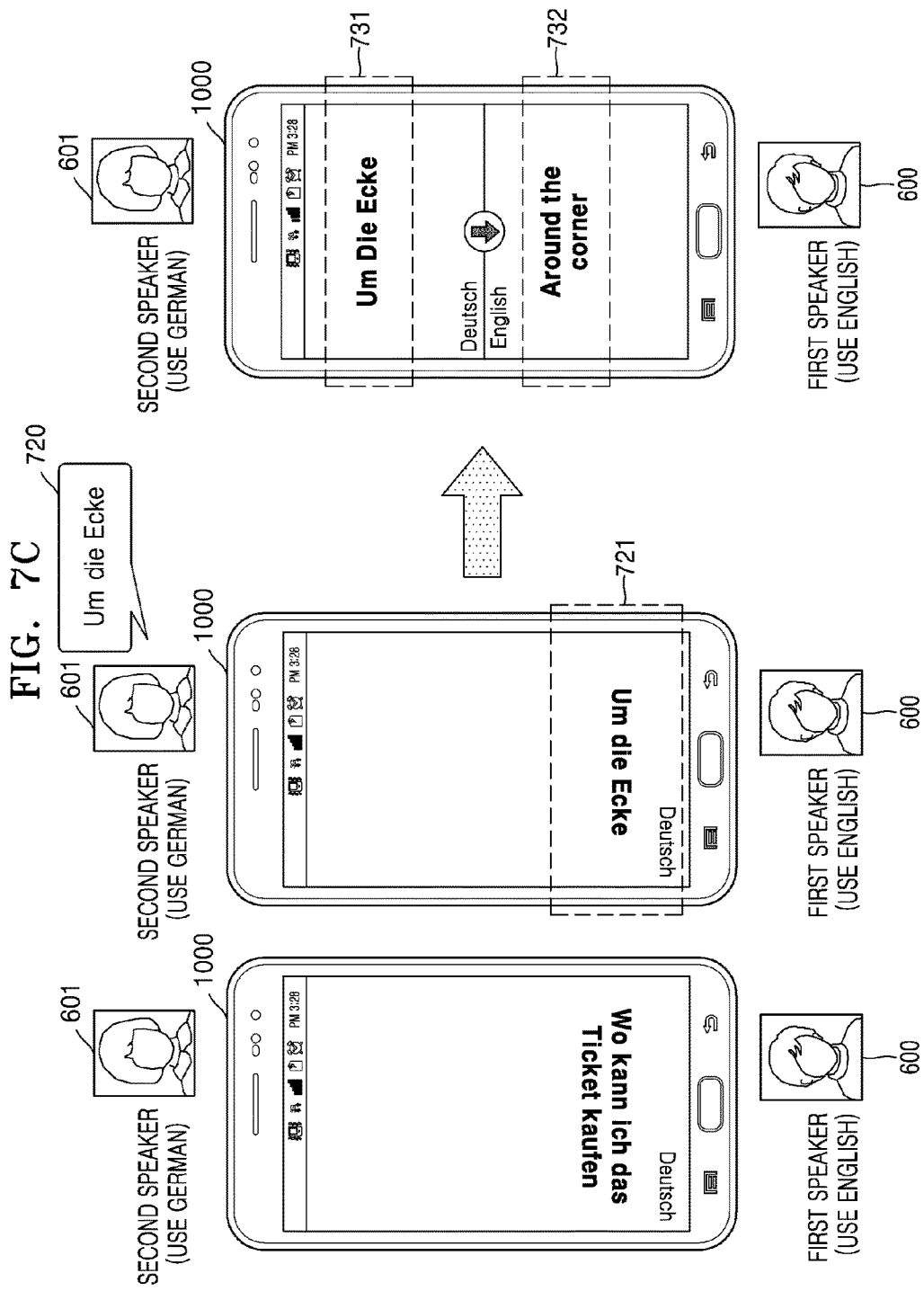

DEVICE AND METHOD FOR VOICE TRANSLATION

CROSS-REFERENCE TO RELATED APPLICATION

This application claims the benefit of foreign priority from Korean Patent Application No. 10-2016-0040201, filed on Apr. 1, 2016, in the Korean Intellectual Property Office, the disclosure of which is incorporated herein by reference in its entirety.

BACKGROUND

1. Field

The present disclosure relates to a device and a method for voice translation, and more particularly, to a portable device and a method of voice translation using the portable device.

2. Description of the Related Art

A voice translation function included in an electronic device may be used when speakers speaking different languages are having a conversation. Also, when the voice translation function in the electronic device is used, a process of determining a translation direction is performed by setting an input language and an output language that are to be subjected to the translation. Here, the translation direction may be manually set by a speaker. However, when the translation direction is manually set, the translation direction needs to be constantly changed while the conversation is ongoing, and this may be inconvenient. In this regard, if an electronic device may automatically set a translation direction, the electronic device may allow the speakers using different languages to have a conversation more conveniently. Also, when the translation direction is automatically set, it is important that the electronic device correctly sets the translation direction so that the speakers may have a conversation more conveniently and understand each other.

SUMMARY

Provided are a device and method for voice translation.

Additional aspects will be set forth in part in the description which follows and, in part, will be apparent from the description, or may be learned by practice of exemplary embodiments.

According to an aspect of an exemplary embodiment, an electronic device includes a voice receiver configured to receive a voice signal; a processor configured to divide the voice signal into a plurality of voice segments, determine an input language and a speaker that correspond to each of the plurality of voice segments, determine a translation direction based on the input language and the speaker of the voice segments, and translate the voice segments according to the translation direction to generate a translation result; and an output device configured to output the translation result.

The processor may determine the translation direction as a first direction when the voice segment is a voice segment that has been spoken in a first language by a first speaker and may determine the translation direction as a second direction when the voice segment is a voice segment that has been spoken in a second language by a second speaker.

The first direction may be a direction of translation from the first language to the second language, and the second direction may be a direction of translation from the second language to the first language.

The processor may determine an input language of the voice segment based on the speaker of the voice segment when a difference between a possibility of the voice segment being spoken in the first language and a possibility of the voice segment being spoken in the second language is equal to or lower than a threshold value.

The processor may determine the input language of the voice segment as the first language when the speaker of the voice segment is determined as the first speaker and determine the input language of the voice segment as the second language when the speaker of the voice segment is determined as the second speaker.

The processor may stop translating the voice segment when the voice segment is a voice segment that has been spoken in the second language by the first speaker or a voice segment that has been spoken in the first language by the second speaker.

The processor may divide the voice signal into the plurality of voice segments in a time frame unit of a predetermined length.

The processor may divide the voice signal into the plurality of voice segments so that adjacent voice segments overlap each other.

The output unit may rotate texts that show the translation result and display on a screen when the translation of the voice signal is completed.

According to an aspect of another exemplary embodiment, a method of voice translation includes receiving a voice signal; dividing the voice signal into a plurality of voice segments; determining an input language and a speaker for each of the plurality of voice segments; determining a translation direction based on the input language and the speaker for each of the plurality of voice segments; translating the voice segments according to the translation direction to generate a translation result; and outputting the translation result.

The determining of the translation direction may include determining the translation direction as a first direction when the voice segment is a voice segment that has been spoken in a first language by a first speaker and determining the translation direction as a second direction when the voice segment is a voice segment that has been spoken in a second language by a second speaker.

The first direction may be a direction of translation from the first language to the second language, and the second direction may be a direction of translation from the second language to the first language.

The determining of the input language and the speaker for the voice segments may include determining an input language of the voice segment based on the speaker of the voice segment when a difference between a possibility of the voice segment being spoken in the first language and a possibility of the voice segment being spoken in the second language is equal to or lower than a threshold value.

The determining of the input language and the speaker for the voice segments may further include determining the input language of the voice segment as the first language when the speaker of the voice segment is determined as the first speaker and determining the input language of the voice segment as the second language when the speaker of the voice segment is determined as the second speaker.

The translating of the voice segments may include stopping translating the voice segment when the voice segment is a voice segment that has been spoken in the second language by the first speaker or a voice segment that has been spoken in the first language by the second speaker.

The dividing of the voice signal into the plurality of voice segments may include dividing the voice signal into the plurality of voice segments in a time frame unit of a predetermined length.

The dividing of the voice signal into the plurality of voice segments may include dividing the voice signal into the plurality of voice segments so that adjacent voice segments overlap each other.

The outputting of the translation result may include rotating and displaying a text showing the translation result on a screen when the translating of the voice signal is completed.

BRIEF DESCRIPTION OF THE DRAWINGS

These and/or other aspects will become apparent and more readily appreciated from the following description of exemplary embodiments, taken in conjunction with the accompanying drawings in which:

FIGS. 7A to 7C are views illustrating a process of outputting of a translation result by the electronic device according to an exemplary embodiment;

DETAILED DESCRIPTION OF EXEMPLARY EMBODIMENTS

Figure 1:
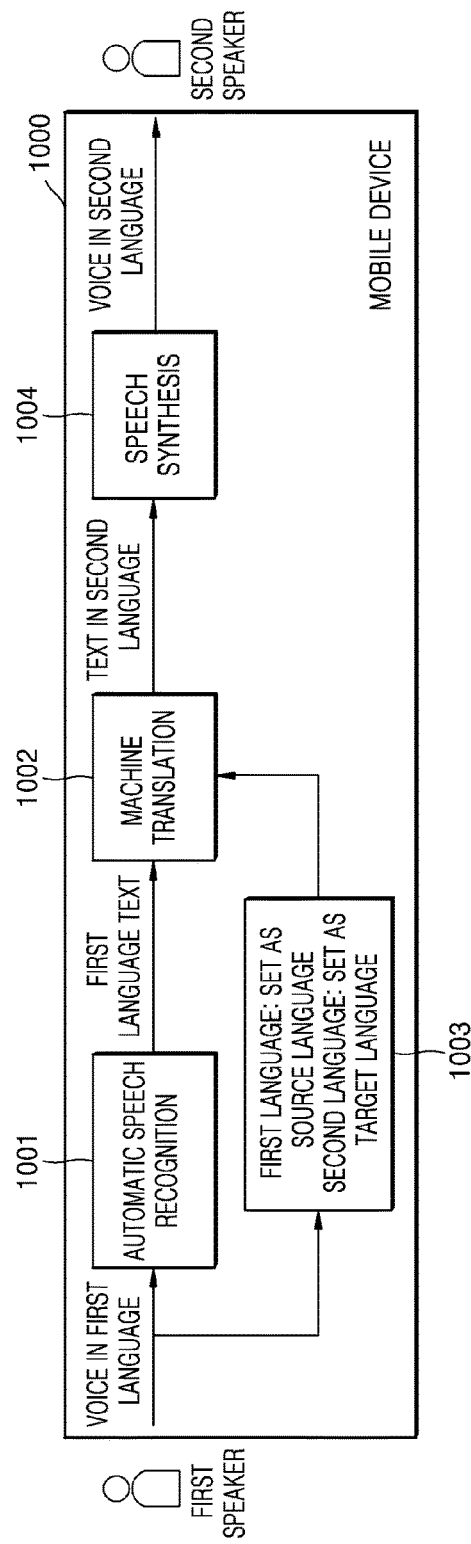
FIG. 1 is a block diagram of a speech-to-speech translation system according to an exemplary embodiment.

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in this specification are those general terms currently widely used in the art in consideration of functions regarding the inventive concept, but the terms may vary according to the intention of one of ordinary skill in the art, precedents, or new technology in the art. Also, some terms may be arbitrarily selected by the applicant, and in this case, the meaning of the selected terms will be described in detail in the detailed description of the present specification. Thus, the terms used herein have to be defined based on the meaning of the terms together with the description throughout the specification.

Also, the terms used in the present disclosure are for purposes of illustration only and are not intended to limit the scope of the present disclosure. As used herein, the singular forms "a," "an" and "the" are intended to include the plural forms as well, unless the context clearly indicates otherwise. Also, throughout the specification, it will be understood that when a component is "connected" to another component, this includes the case when the components are "directly connected" to each other as well as when the components are "electrically connected" with another device therebetween. Also, when a component "includes" an element, unless there is another opposite description thereto, it should be understood that the component does not exclude another element and may further include another element.

The use of the term "the" and similar referents in the context of describing the inventive concept, especially in the context of the following claims, are to be construed to cover both the singular and the plural. Also, the steps of all methods described herein can be performed in any suitable order unless otherwise indicated herein or otherwise clearly contradicted by context. The inventive concept is not limited to the described order of the steps.

As found in several parts of the present specification, the terms "in some embodiments" or "in one embodiment" do not necessarily refer to the same embodiment.

Exemplary embodiments may be described in terms of functional block components and various processing steps. Some of or the whole functional blocks may be realized by any number of hardware and/or software components configured to perform the specified functions. For example, the exemplary embodiments may employ various integrated circuit components, which may carry out a variety of functions under the control of one or more microprocessors or other control devices. Similarly, exemplary embodiments may be implemented with any programming or scripting language. Functional aspects may be implemented in algorithms that are executed on one or more processors. Furthermore, exemplary embodiments could employ any number of conventional techniques for electronics configuration, signal processing, and/or data processing and the like. The words "mechanism," "element," "means," and "configuration" are used broadly and are not limited to mechanical or physical exemplary embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, exemplary embodiments will be described in detail with reference to the accompanied drawings.

FIG. 1 is a view illustrating a speech-to-speech translation system according to an embodiment of the present disclosure.

When a first speaker and a second speaker have a conversation, the first speaker and the second speaker may speak in different languages. For example, the first speaker may use a first language, and the second speaker may use a second language. Also, the first speaker and the second speaker may have a conversation by using an electronic device 1000 that performs translation between the first language and the second language.

The electronic device 1000 may include a mobile device, a smartphone, a tablet personal computer (PC), a laptop computer, an electronic book terminal, or a wearable device, but is not limited thereto.

When a voice signal of a voice that has been spoken in the first language by the first speaker is received, the electronic device 1000 performs automatic speech recognition (ASR) 1001 and may convert the received voice signal into a text of the first language. The ASR denotes a process of automatically recognizing a voice signal that has been spoken by a speaker and converting the signal into a text. The ASR may be referred to as "speech to text (STT)" conversion in some exemplary embodiments, but the term is not limited thereto.

The electronic device 1000 may perform machine translation (MT) 1002 to translate a text of the first language into a text of the second language. When the MT is performed, the first language used by the first speaker may be set as a source language, and the second language used by the second speaker may be set as a target language 1003. Here, the source language denotes a language that is the subject of translation input by the first speaker, and the target language denotes a language that has been translated and output as a result.

Once the MT is completed, the electronic device 1000 performs text to speech (TTS) conversion 1004 to convert the text of the second language into a voice signal in the second language. Also, the electronic device 1000 may output the voice signal of the second language via a speaker. Also, the electronic device 1000 may output the translated text of the second language on a screen.

As shown in FIG. 1, when two speakers (e.g., a first speaker and a second speaker) have a conversation by using different languages (e.g., a first language and a second language), the electronic device 1000 may translate the first language into the second language or may translate the second language into the first language. Here, a process of correctly determining a translation direction is important for the first speaker and the second speaker to have a conversation. Hereinafter, for convenience of description, a translation direction from the first language to the second language may be referred to as a first direction, and a translation direction from the second language to the first language may be referred to as a second direction.

Figure 2:
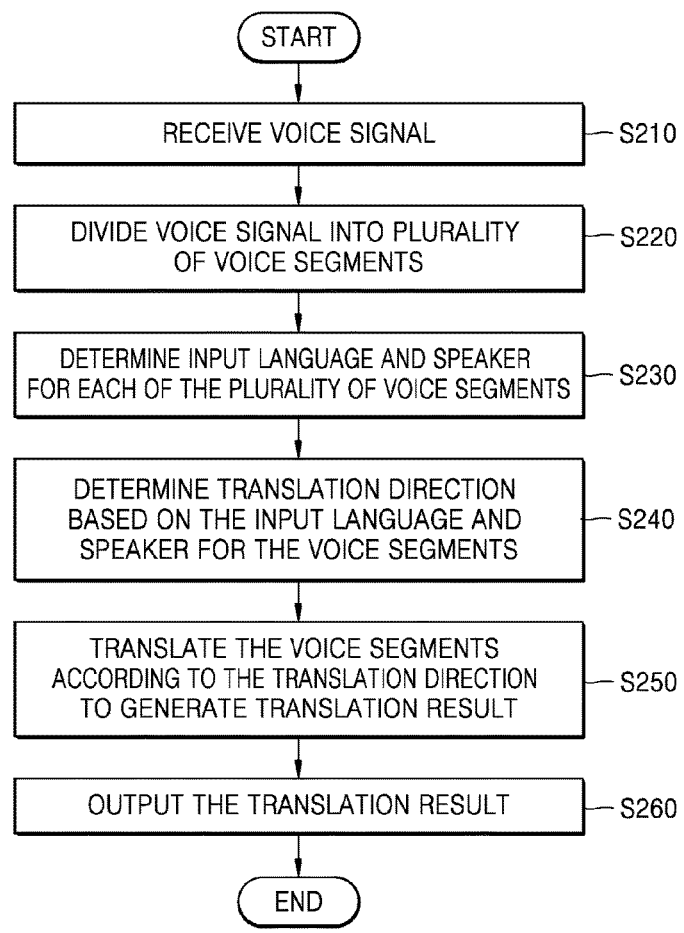
FIG. 2 is a flowchart of a speech-to-speech translation method according to an exemplary embodiment.

FIG. 2 is a flowchart of a speech-to-speech translation method according to an exemplary embodiment.

In S210, the electronic device 1000 receives a voice signal. Here, the voice signal may have been spoken by a speaker in at least one language. For example, the voice signal may have been spoken in one language such as "Please wait, I will be back" (e.g., in English) or may have been spoken in two languages that are mixed such as "When does the Oktoberfest start?" (e.g., in English and German).

In S220, the electronic device 1000 divides the voice signal into a plurality of voice segments.

The electronic device 1000 may divide the voice signal into a plurality of voice segments in time frame units of a predetermined length. For example, when a length of each time frame is 20 ms, the electronic device 1000 may divide the voice signal into a plurality of voice segments each being 20 ms long.

Also, the electronic device 1000 may divide a voice signal into a plurality of voice segments so that adjacent voice segments may overlap one another. For example, when the voice segments overlap by about 10 ms, the voice signal corresponding to 0 ms to 20 ms may be a first voice segment, the voice signal corresponding to 10 ms to 30 ms may be a second voice segment, and the voice signal corresponding to 20 ms to 40 ms may be a third voice segment. Thus, a different voice segment may be generated every 10 ms. However, in some exemplary embodiments, a length of the time frame and a period of time the voice segments overlap one another may change, but the periods of time are not limited thereto.

In S230, the electronic device 1000 determines an input language and a speaker of each of the plurality of voice segments.

The electronic device 1000 may determine an input language of the voice segments by using a language recognition method and may determine a speaker of the voice segments by using a speaker recognition method. Here, the electronic device 1000 may use a language recognition method and a speaker recognition method in a voice segment unit. Also, the electronic device 1000 may increase reliability with respect to the determined input language and speaker by determining the input language and speaker in a voice segment unit.

Here, the language recognition method refers to a method that determines the language in which the voice signal of the voice is spoken by the speaker, and the speaker recognition method refers to a method that determines the speaker by extracting the speaker's unique characteristics included in the voice signal. The process of determining the input language and speaker of the voice segments by using the language recognition method and the speaker recognition method will be described by referring to FIGS. 3A to 4.

In S240, the electronic device 1000 determines a translation direction based on an input language and a speaker of the voice segments. For example, the translation direction may include a first direction that is a direction of translation from the first language to the second language and a second direction that is a direction of translation from the second language to the first language, but exemplary embodiments are not limited thereto.

When the voice segment is a voice segment spoken in the first language by the first speaker, the electronic device 1000 may determine a translation direction as the first direction. Also, when the voice segment is a voice segment spoken in the second language by the second speaker, the electronic device 1000 may determine a translation direction as the second direction.

For example, the first speaker may speak in English, and the second speaker may speak in German. Here, when the first speaker says "Where can I buy the ticket?" in the first language, the electronic device 1000 may translate "Where can I buy the ticket?" into German, which is the second language.

The electronic device 1000 may not translate a voice segment that is spoken in the second language by the first speaker or spoken in the first language by the second speaker. For example, the first speaker may speak two languages in combination such as "When does the Oktoberfest start?" (e.g., English and German). Here, although "Oktoberfest" is a German word, which is the second language, the word is spoken by the first speaker, and thus the electronic device 1000 does not have to translate "Oktoberfest" to German.

As described above, since a translation direction is determined in a voice segment unit, the electronic device 1000 may distinguish and process voice segments that do not need translation when one speaker speaks two languages in combination.

As a result of using the language recognition method, whether an input language of a voice segment is the first language or the second language may not be clear. For example, as a result of using the language recognition method, a difference between a possibility of the voice segment being spoken by the first language and a possibility of the voice segment being spoken by the second language may be a critical value or lower. Here, the electronic device 1000 may determine the input language based on a speaker of the voice segment determined by the speaker recognition method. For example, when an input language of the voice segment determined by the language recognition method is not clear, and when the voice segment is spoken by the first speaker, the electronic device 1000 may determine the input language of the voice segment as the first language. Also, when the vice segment is spoken by the second speaker, the electronic device 1000 may determine the input language of the voice segment as the second language. Further, the electronic device 1000 may determine a translation direction based on the speaker and the determined input language of the voice segment. In this regard, the electronic device 1000 may accurately determine a translation direction.

In S250, a translation result is generated by translating the voice segments according to the translation direction determined by the electronic device 1000.

For example, the electronic device 1000 may translate the voice segments, of which a translation direction is determined as the first direction, from the first language to the second language. Also, the electronic device 1000 may translate the voice segments, of which a translation direction is determined as the second direction, from the second language to the first language.

In S260, the electronic device 1000 may output the translation result.

The electronic device 1000 may output the translation result as sound and/or text. For example, the electronic device 1000 may output the translation result as sound via a speaker and/or may output the translation result as text on a screen, but exemplary embodiments are not limited thereto.

Figure 3A:
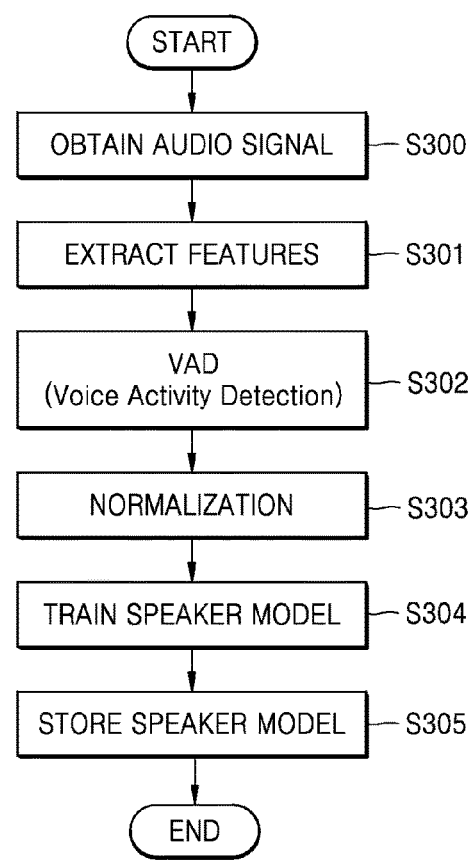
FIGS. 3A and 3B is a flowchart illustrating a process of determining a speaker by using a speaker recognition method in an electronic device, according to an exemplary embodiment.
Figure 3B:
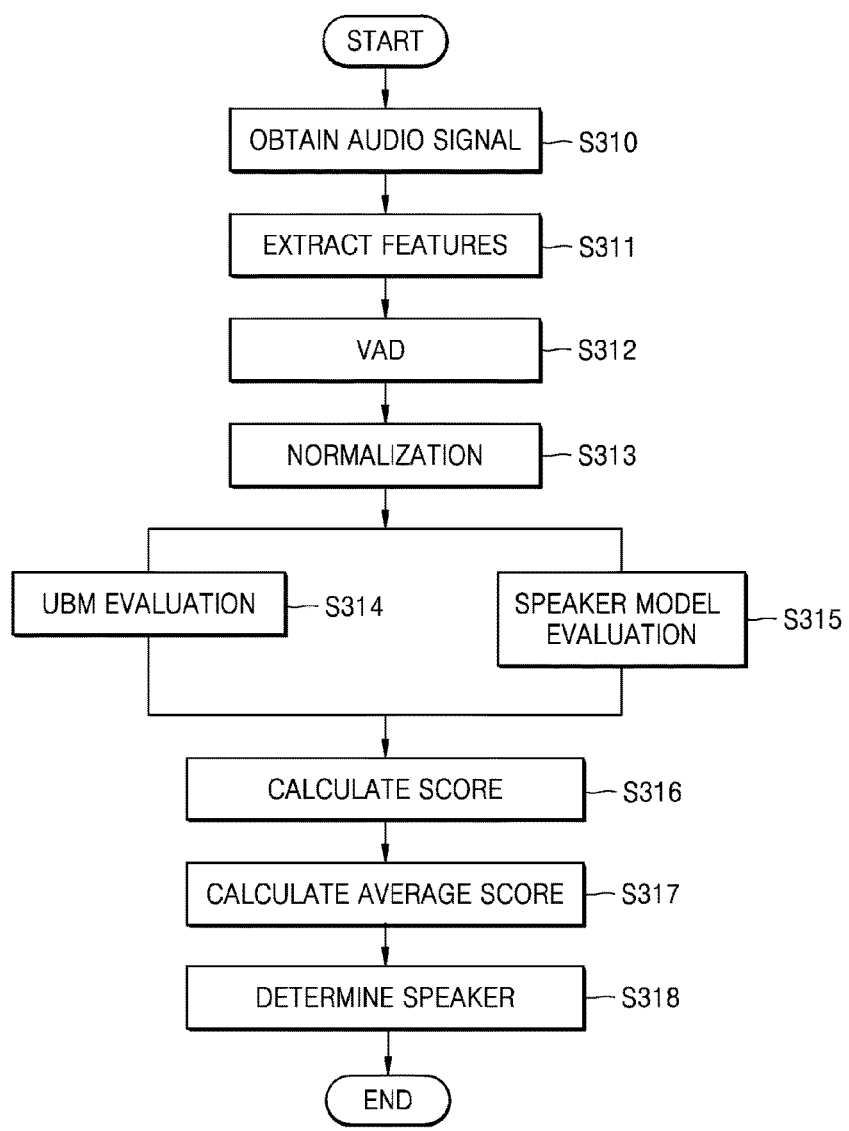

FIGS. 3A and 3B are flowcharts illustrating a process of an electronic device 1000 determining a speaker by using a speaker recognition method, according to an exemplary embodiment.

The electronic device 1000 may determine a speaker of a plurality of voice segments by using a speaker recognition method. For example, the electronic device 1000 may determine a speaker of a plurality of voice segments by using a Gaussian Mixture Models with Universal Background Model (GMM-UBM) method. Also, the electronic device 1000 may determine a speaker of a plurality of voice segments by using a support vector machine (SVM) or a support vector machine using a GMM super vector (SVM-GSV) method, but exemplary embodiments are not limited thereto. Hereinafter, for convenience of description, exemplary embodiments are exemplified in a case of determining a speaker by using Gaussian Mixture Models.

The speaker recognition method may include a speaker model enrollment process and a speaker verification process.

FIG. 3A is a flowchart illustrating the speaker model enrollment process according to an exemplary embodiment.

Referring to FIG. 3A, in S300, the electronic device 1000 may obtain an audio (voice) signal to enroll a speaker model. For example, the electronic device 1000 may obtain a voice signal via a microphone, and a plurality of microphones may be used in some exemplary embodiments. Here, the voice signal may include peripheral sounds in addition to a voice signal of a voice spoken by a speaker. For example, the voice signal may include a voice signal of a voice spoken by a speaker, conversations of surrounding people, vehicle sounds, and ring tones of mobile phones, but the voice signal is not limited thereto.

In S301, the electronic device 1000 may extract characteristics of a voice signal from the obtained voice signal.

Here, the electronic device 1000 may represent the extracted characteristics of the voice signal by using mel frequency cepstral coefficients (MFCCs). For example, the electronic device 1000 may short-time fourier transform (STFT) the voice signal with respect to a 20 ms section in a period of time of 10 ms. Also, the electronic device 1000 may obtain energy values of the voice signal which correspond to each frequency band by using a mel-scale filter bank. The electronic device 1000 may calculate MFCCs by discrete cosine transforming (DCT) log values of the obtained energy values. The calculated MFCCs constitute feature vectors that represent characteristics of the voice signal. The electronic device 1000 may represent characteristics of the extracted voice signal, in addition to MFCCs, by using linear prediction coefficients (LPCs) and a filter bank energy method, but exemplary embodiments are not limited thereto.

The electronic device 1000 may extract characteristics of a voice signal in units of voice segments. As described above, the electronic device 1000 may divide a voice signal into time frame units of a predetermined length and may generate a plurality of voice segments. Also, the electronic device 1000 may divide a voice signal into a plurality of voice segments so that adjacent voice segments may overlap each other. For example, when the adjacent voice segments overlap each other by 10 ms, the electronic device 1000 extracts characteristics of a voice segment in 10 ms units.

In S302, the electronic device 1000 may detect whether each of the voice segments includes the voice of the speaker (voice activity detection "VAD"). For example, the voice segments may include peripheral sounds in addition to the voice of the speaker. Thus, the electronic device 1000 may accurately determine the speaker by distinguishing and processing the voice segments including the voice of the speaker.

In S303, the electronic device 1000 may normalize the voice segments including the voice of the speaker. The electronic device 1000 may cancel an effect of a voice signal channel that varies with the environment by normalizing the voice segments.

In S304, the electronic device 1000 may train a speaker model. The electronic device 1000 may train the speaker model based on a universal background model (UBM) and a maximum a posteriori (MAP) method.

In S305, the electronic device 1000 may save the speaker model e.g., store it in a memory of the device and/or remote server.

A process of enrolling the speaker model may be performed once at the initial stage, and when the speaker model has been enrolled and/or generated, the electronic device 1000 may verify a speaker by using the saved speaker model.

FIG. 3B is a flowchart illustrating a speaker verification process according to an exemplary embodiment.

Referring to FIG. 3B, in S310, the electronic device 1000 may obtain an audio signal (e.g., a voice signal) to verify a speaker. Also, as well as in the speaker enrollment process, the electronic device 1000 may extract characteristics of a voice signal in a voice segment unit (S311) and may detect whether the voice of the speaker is included in the voice segment or not (S312). Also, in S313, the electronic device 1000 may normalize voice segments including the voice of the speaker.

In S314 and S315, the electronic device 1000 may evaluate the UBM and the speaker model. Here, the electronic device 1000 may calculate each possibility of the characteristics extracted from the voice segments being generated from the UBM and the speaker model.

Also, in S316, the electronic device 1000 may calculate a score to determine the speaker of the voice segments.

In S317, the electronic device 1000 may calculate an average score of the voice segments. For example, the electronic device 1000 may calculate an average score of 10 voice segments, but exemplary embodiments are not limited thereto.

In S318, the electronic device 1000 may determine a speaker of the voice segments based on the calculated average score. In S316, the score is calculated in a voice segment unit, and since the voice segment is a voice signal of a relatively short length, this may reduce the accuracy of speaker determination. Thus, the electronic device 1000 may determine a speaker based on an average score calculated with respect to the voice segments to accurately determine a speaker.

Figure 4:
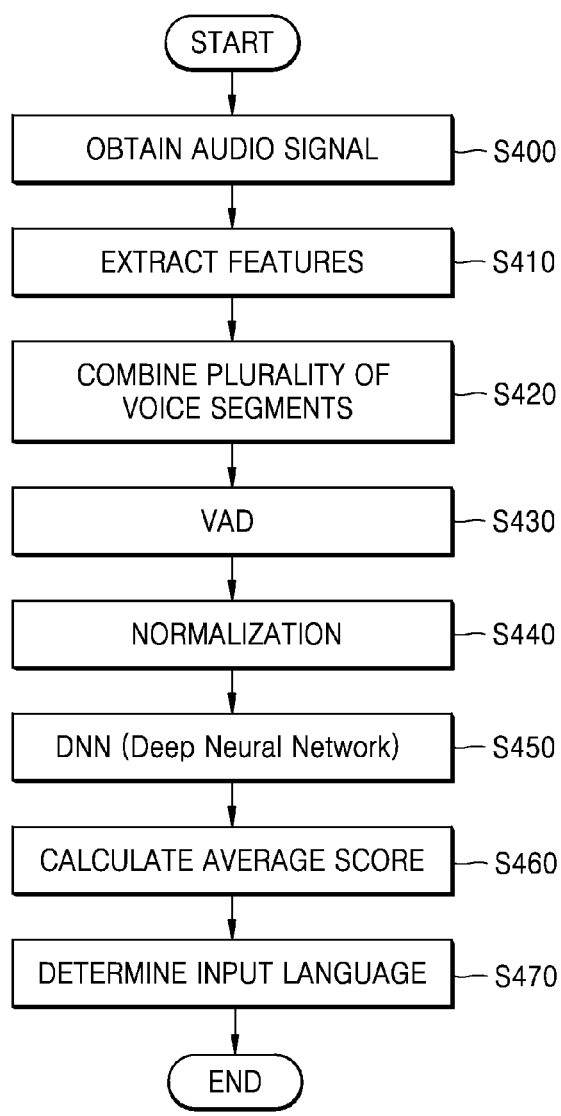
FIG. 4 is a flowchart illustrating a process of determining an input language of a voice signal in the electronic device according to an exemplary embodiment.

FIG. 4 is a flowchart illustrating a process of determining an input language of a voice signal in an electronic device 1000, according to an exemplary embodiment.

The electronic device 1000 may determine a language of a plurality of voice segments by using a language recognition method. The language recognition method may include I-vector, universal phoneme decoder, shifted delta cepstrum (SDC), and deep neural network (DNN) methods, but exemplary embodiments are not limited thereto. Hereinafter, a process of determining an input language of a plurality of voice segments by using a DNN method will be described. The DNN method is an artificial neural network including a plurality of hidden layers between an input layer and an output layer, which is one of machine learning methods capable of modeling complex nonlinear relationships. The DNN method is generally known to those of ordinary skill in the art.

Referring to FIG. 4, in S400, the electronic device 1000 may obtain an audio signal (e.g., a voice signal).

Also, in S410, the electronic device 1000 may extract characteristics of the obtained voice signal. For example, the electronic device 1000 may extract characteristics of the obtained voice signal by using a mel-scale filter bank.

In S420, the electronic device 1000 may stack a plurality of voice segments. For example, the electronic device 1000 may stack a voice segment that is currently being processed and a plurality of voice segments located before/after the voice segment that is currently being processed. For example, when 26 voice segments are stacked, the electronic device 1000 may stack a voice segment that is currently being processed, 20 voice segments located before the voice segment that is currently being processed, and 5 voice segments located after the voice segment that is currently being processed. However, exemplary embodiments are not limited thereto, and the number and combination of voice segments that are being stacked may vary in some exemplary embodiments.

In S430, the electronic device 1000 may detect whether each of the voice segments includes the voice of the speaker or not.

Also, in S440, the electronic device 1000 may normalize voice segments in which the voice of the speaker is detected.

In S450, the electronic device 1000 may calculate a score to determine an input language of the voice segments based on the Deep Neural Network (DNN) method.

Also, in S460, the electronic device 1000 may calculate an average score with respect to a plurality of voice segments. For example, the electronic device 1000 may calculate an average score for 10 voice segments, but exemplary embodiments are not limited thereto. When the voice segments are divided into time frame units having lengths of 20 ms, and each of the voice segments overlaps with an adjacent voice segment by 10 ms, the average score may be calculated in 10 ms units.

In S470, the electronic device 1000 may determine an input language of the voice segments based on the calculated average score. For example, the electronic device 1000 may determine a language with the highest average score as an input language of the voice segments. The electronic device 1000 may determine the input language based on the average score to accurately determine the input language.

Figure 5A:
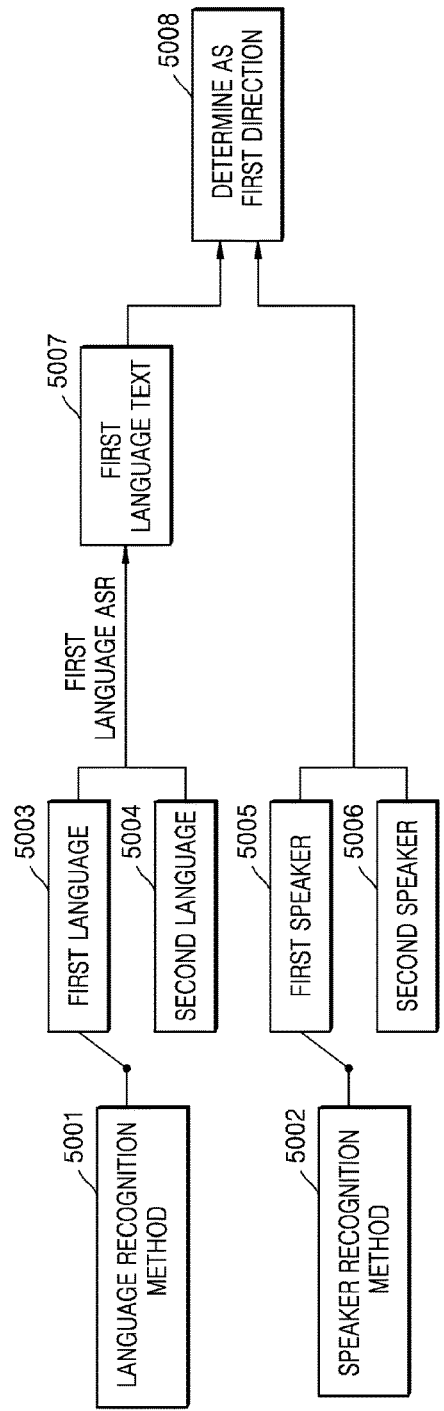
FIGS. 5A and 5B are flow diagrams illustrating a process of determining a translation direction in the electronic device according to an exemplary embodiment.
Figure 5B:
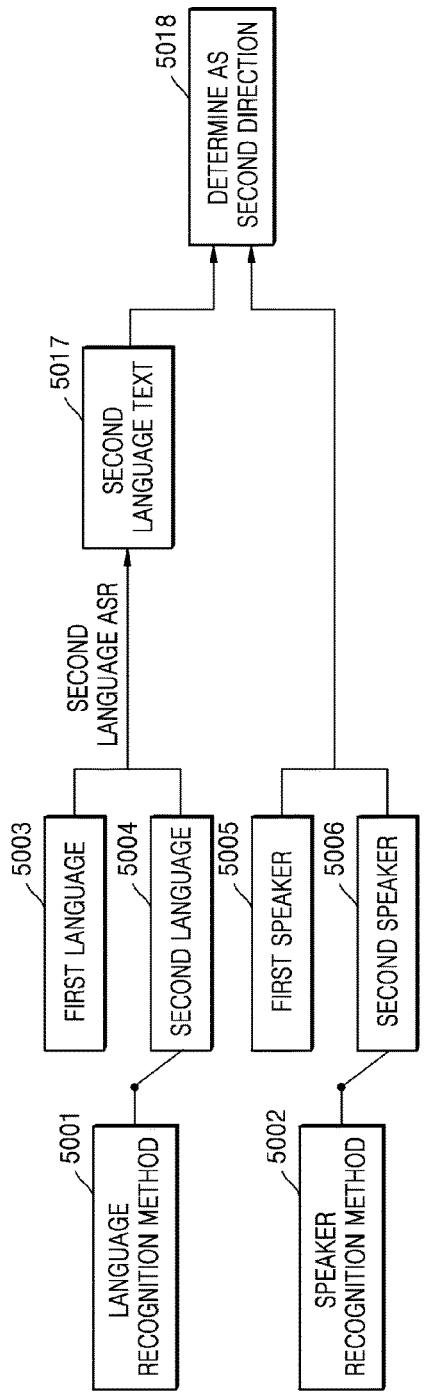

FIGS. 5A and 5B are flow diagrams illustrating a process of determining a translation direction in the electronic device according to an exemplary embodiment.

When a first speaker using a first language and a second speaker using a second language have a conversation, the electronic device 1000 may determine whether an input language of a received voice signal is the first language or the second language by using a language recognition method 5001. Also, the electronic device 1000 may determine whether a speaker of the received voice signal is the first speaker or the second speaker by using a speaker recognition method 5002. Here, the electronic device 1000 may divide the voice signal into a plurality of voice segments and may determine an input language as the first language 5003 or the second language 5004 and a speaker in a voice segment unit as the first speaker 5005 or the second speaker 5006.

For example, referring to FIG. 5A, the electronic device 1000 may determine an input language of the voice segment as the first language by using the language recognition method. In this regard, the electronic device 1000 may convert the voice signal of the first language into a first language text 5007. Also, the electronic device 1000 may determine a speaker of the voice segment as the first speaker by using the speaker recognition method. Then, the electronic device 1000 may determine a translation direction as a first direction 5008 based on the input language and speaker of the voice segment.

Also, referring to FIG. 5B, the electronic device 1000 may determine an input language of the voice segment as a second language 5017 by using the language recognizing method. In this regard, the electronic device 1000 may convert the voice signal of the second language into a second language text. Also, the electronic device 1000 may determine a speaker of the voice segment as the second speaker by using the speaker recognition method. Then, the electronic device 1000 may determine a translation direction as a second direction 5018 based on the input language and speaker of the voice segment.

Also, as described above, the electronic device 1000 does not translate a voice segment that has been spoken in the second language by the first speaker or a voice segment that has been spoken in the first language by the second speaker, according to an exemplary embodiment.

Figure 6A:
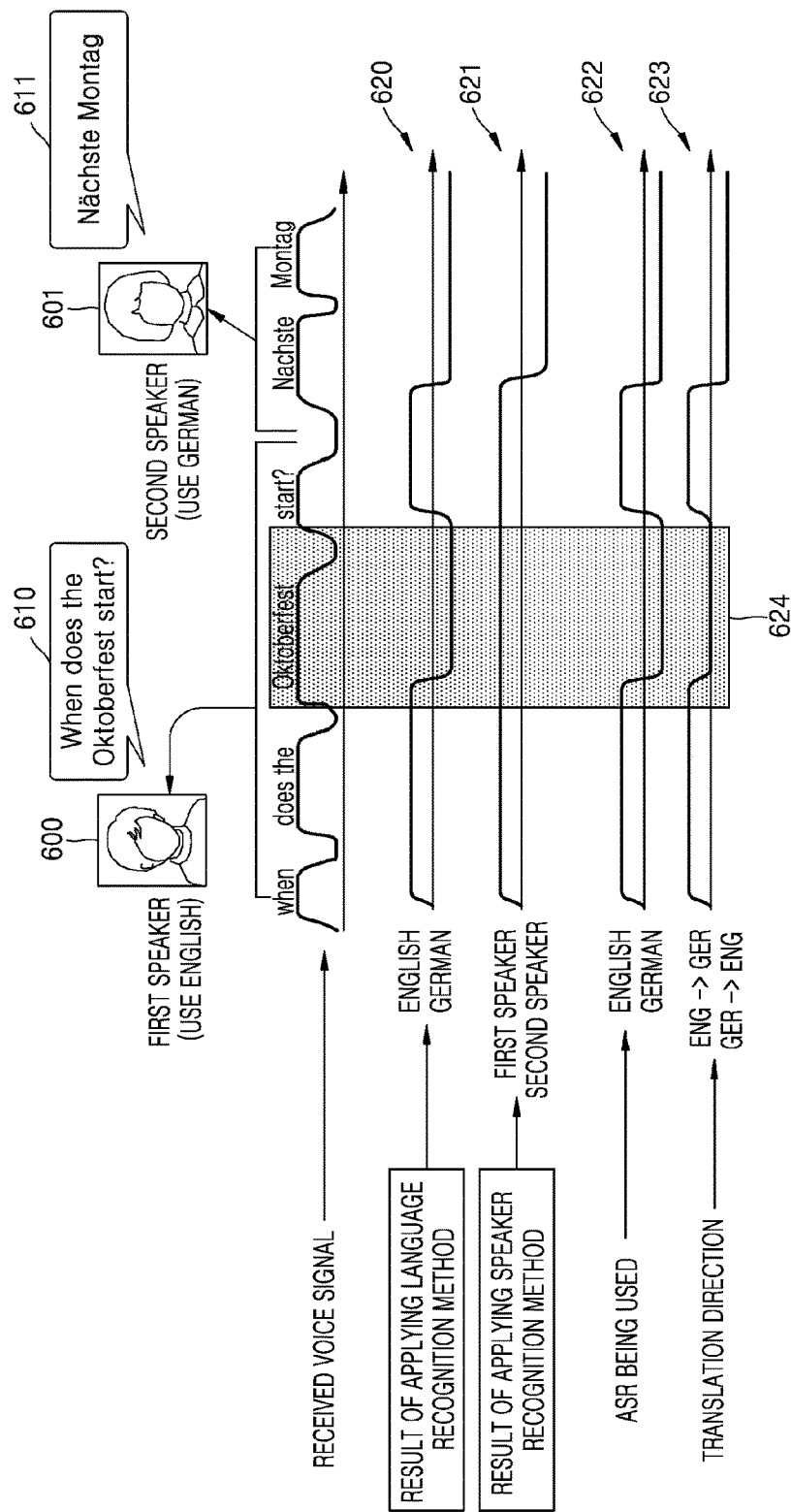
FIG. 6A is a view illustrating a process of performing translation in the electronic device according to an exemplary embodiment.

FIG. 6A is a view illustrating an example of translation performed by the electronic device 1000, according to an exemplary embodiment. Hereinafter, an example of a first speaker 600 speaking in English and a second speaker 601 speaking in German will be used to describe an exemplary embodiment.

For example, referring to FIG. 6A, the first speaker 600 may say the sentence "When does the Oktoberfest start?" in English. The electronic device 1000 may receive a voice signal 610 of a voice that has been spoken by the first speaker 600.

Figure 6B:
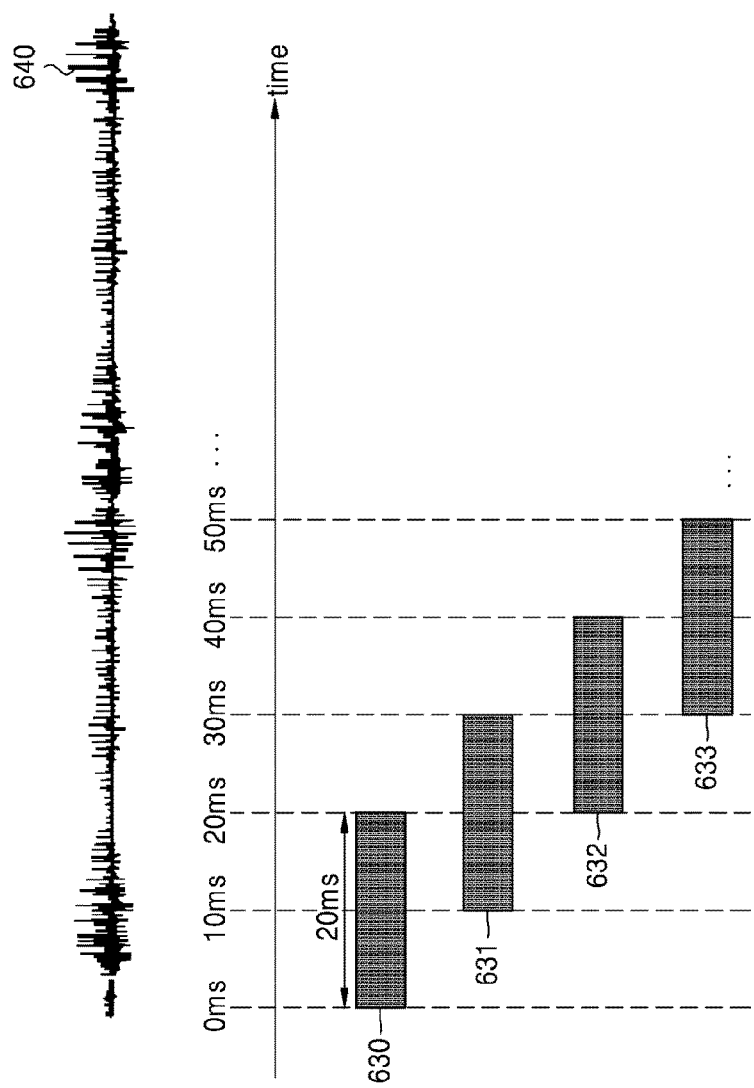
FIG. 6B is a view illustrating a process of dividing a voice signal into a plurality of voice segments in the electronic device according to an exemplary embodiment.

The electronic device 1000 may divide the voice signal 610 of the voice that has been spoken by the first speaker 600 into a plurality of voice segments. A process of dividing the voice signal 610 into a plurality of voice segments will be described by referring to FIG. 6B. Also, the electronic device 1000 may determine an input language and a speaker of each of the voice segments.

Referring to a graph 620 shown in FIG. 6A, the electronic device 1000 may determine whether an input language of each of the voice segments is English or German. For example, the electronic device 1000 may determine an input language of "Oktoberfest" in the voice signal of the voice spoken by the first speaker 600 as German, and an input language of the other terms as English. Also, referring to a graph 622 shown in FIG. 6A, the electronic device 1000 may convert the voice segments of which the input language is determined as English into a text. Also, the electronic device 1000 may convert the voice segments of which the input language is determined as German into a text.

Also, referring to a graph 621 shown in FIG. 6A, the electronic device 1000 may determine whether a speaker of each of the voice segments is the first speaker 600 or the second speaker 601. For example, the electronic device 1000 may determine a speaker who said the sentence "When does the Oktoberfest start?" as the first speaker 600, and the sentence "NAchste Montag" as the second speaker 601.

Referring to a graph 623 shown in FIG. 6A, the electronic device 1000 may determine a translation direction with respect to the voice segments spoken in English by the first speaker 600 as a first direction. Also, the electronic device 1000 may determine a translation direction with respect to the voice segments spoken in German by the second speaker 601 as a second direction. Here, the first direction is a translation direction from English to German, and the second direction is a translation direction from German to English.

The electronic device 1000 may not translate the voice segments spoken in German by the first speaker 600. When the first speaker 600 using English and the second speaker 601 using German have a conversation, the first speaker 600 may use some German words in a sentence, and, in this case, the words spoken in German do not need to be translated.

For example, referring to a region 624 shown in FIG. 6A, the word "Oktoberfest" is spoken in German by the first speaker 600, and thus the electronic device 1000 does not translate the word "Oktoberfest".

As described above, the electronic device 1000 divides the received voice signal into a plurality of voice segments and may determine a translation direction in consideration of an input language and a speaker of each of the voice segments. Thus, the electronic device 1000 may accurately determine the translation direction even when one speaker speaks at least two different languages in combination.

FIG. 6A shows an example of the electronic device 1000 dividing a voice signal into a plurality of voice segments.

The electronic device 1000 may divide a voice signal 640 generated by the first speaker 600 into a plurality of voice segments. For example, referring to FIG. 6B, the electronic device 1000 may divide the voice signal 640 into a plurality of voice segments 630 to 633 in a time frame unit having a length of 20 ms.

Also, the electronic device 1000 may divide the voice signal 640 into a plurality of voice segments so that adjacent voice segments may overlap each other. For example, referring to FIG. 6B, the electronic device 1000 may divide the voice signal 640 so that adjacent voice segments may overlap by 10 ms. Then, the voice signal 640 corresponding to a region of 0 ms to 20 ms may be a first voice segment 630, the voice signal 640 corresponding to a region of 10 ms to 30 ms may be a second voice segment 631, the voice signal 640 corresponding to a region of 20 ms to 40 ms may be a third voice segment 632, and the voice signal 640 corresponding to a region of 30 ms to 50 ms may be a fourth voice segment 633. In this regard, different voice segments may be generated every 10 ms. However, a length of a time frame and a period of time of the adjacent voice segments being overlapped may differ in some exemplary embodiments, and exemplary embodiments are not limited thereto.

The electronic device 1000 may divide the voice signal 640 into the voice segments 630 to 633 so that adjacent voice segments may overlap each other, and thus a translation direction may be accurately determined.

Figure 7A:
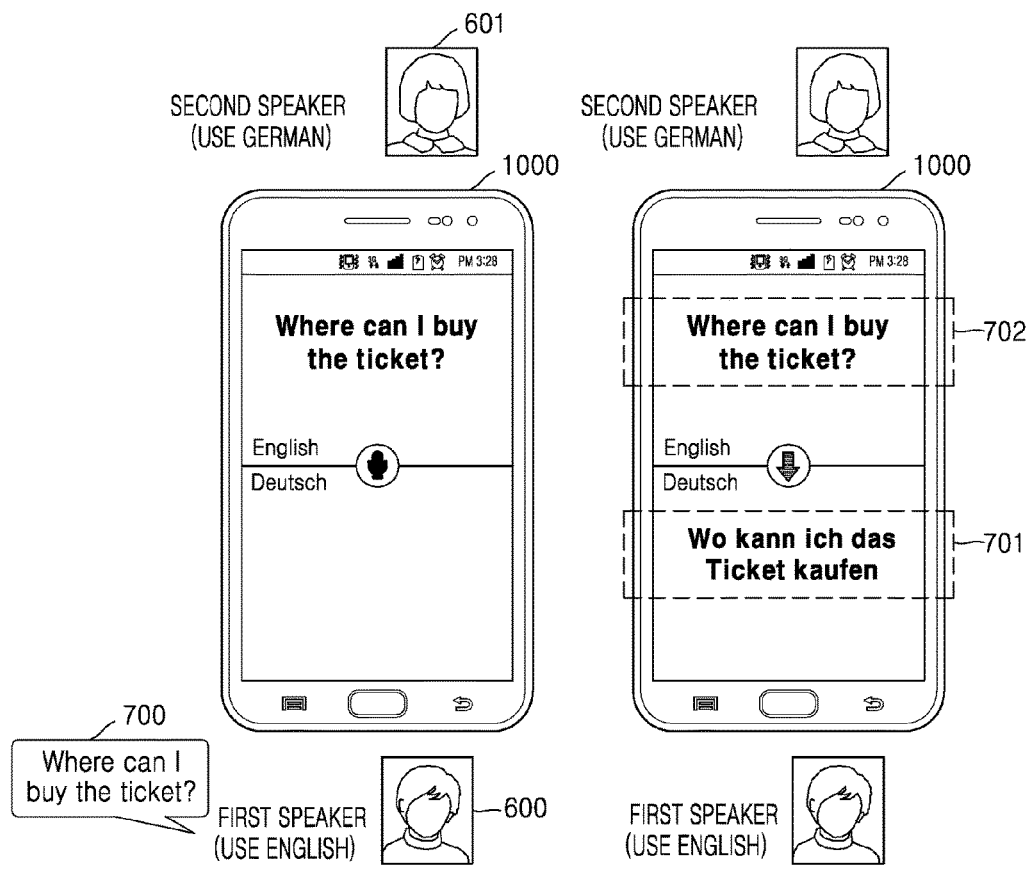
Figure 7B:
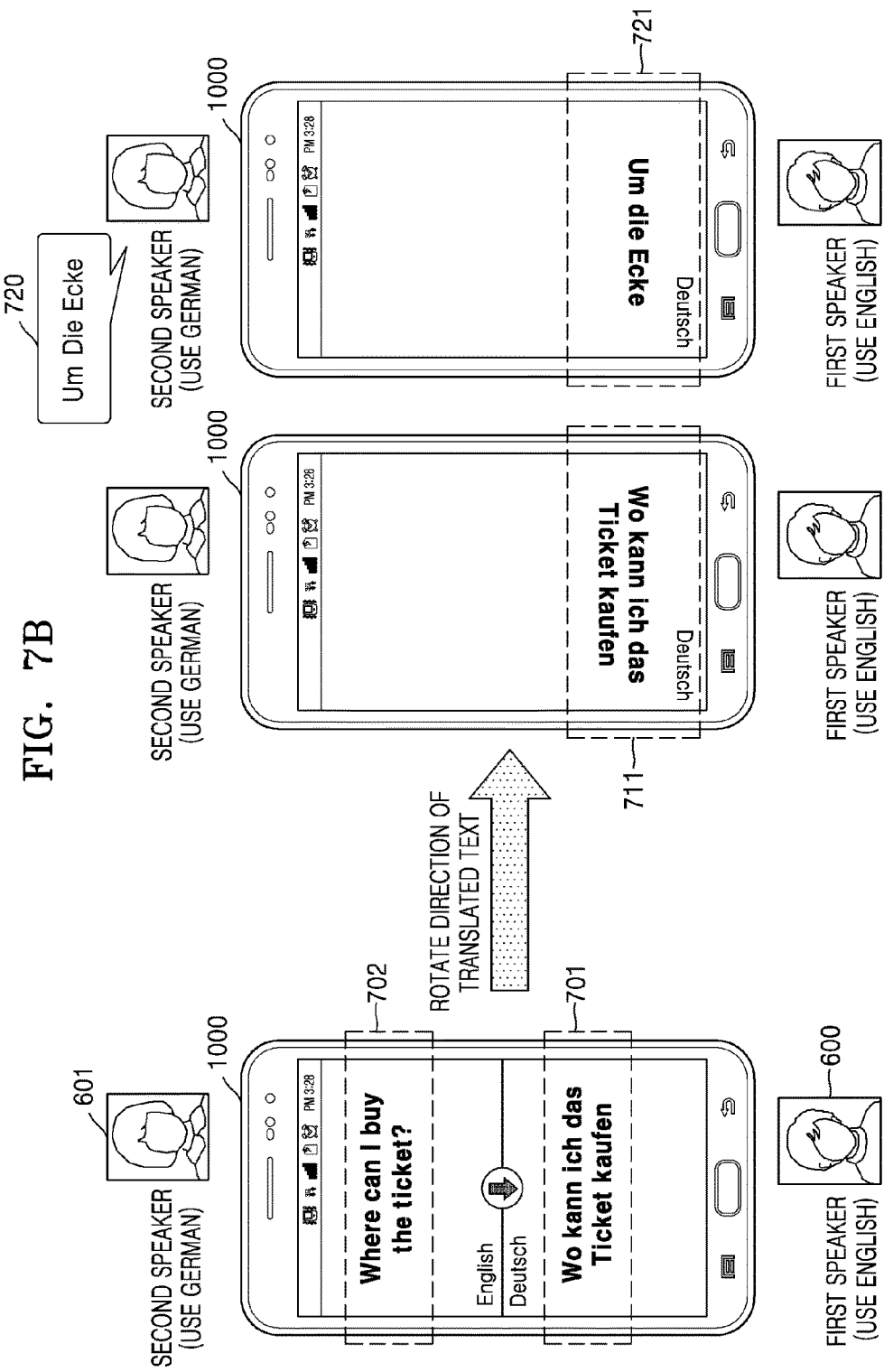

FIGS. 7A to 7C are views illustrating a process of outputting of the translation result by the electronic device 1000 according to an exemplary embodiment.

For example, when a first speaker 600 says "Where can I buy the ticket?" 700 in English, the electronic device 1000 may translate a voice signal of a voice spoken by the first speaker 600 into German. Also, the electronic device 1000 may output the translation result. Here, the electronic device 1000 may display the translation result as a text on a screen or may output the translation result in a voice signal via a speaker, but exemplary embodiments are not limited thereto.

Referring to FIG. 7A, the electronic device 1000 may translate the sentence "Where can I buy the ticket?" 700 spoken by the first speaker 600 into German and may display the translation result "Wo Kann ich das ticket kaufen?" on the screen as a text 701. Here, the electronic device 1000 may display both the translated German text 701 and an English text 702 spoken by the first speaker 600 so that the first speaker 600 may check the translation result.

Also, when the speech of the first speaker 600 ends and once the translation of the voice signal generated by the first speaker 600 is completed, the electronic device 1000 may display only the translated text on the screen. Here, the electronic device 1000 may rotate and display the translated text on the screen so that the second speaker 601 may check the translated text.

For example, referring to FIG. 7B, when the speech ("Where can I buy the ticket?") of the first speaker 600 ends and once the translation ("Wo kann ich das ticket kaufen?") of "Where can I buy the ticket?" is completed, the electronic device 1000 may display 711 the translated text on the screen up-side down. In this regard, the second speaker 601 may easily check the translated German text without the first speaker 600 rotating the electronic device 1000.

Also, the electronic device 1000 may rotate and display the translated text on the screen, synthesize the translated text into a voice signal, and output the synthesized voice signal via a speaker.

The second speaker 601 may check the translation result by using the electronic device 1000 and say a sentence to respond to the first speaker 600 in German. Then, the electronic device may convert a voice signal of the voice spoken by the second speaker 601 into a text, and display the text on the screen. Here, the electronic device 1000 may display the German text up-side down so that the second speaker 601 may easily check the German text displayed on the screen. In this regard, the second speaker 601 may check whether the sentence spoken by the second speaker 601 is correctly recognized in the electronic device 1000 or not.

For example, as shown in FIG. 7B, the second speaker 601 may say "Um Die Ecke" 720 in German in response to the question of the first speaker 600. Then, the electronic device 1000 may determine an input language of the voice signal spoken by the second speaker 601 as German and may convert the voice signal spoken by the second speaker 601 into a German text. Also, the electronic device 1000 may display 721 the German text "Um Die Ecke" up-side down on the screen so that the second speaker 601 may easily check the German text.

Also, when the speech of the second speaker 601 ends, the voice signal generated by the second speaker 601 is translated into English, and the translated text may be displayed on the screen. Here, the electronic device 1000 may display the translated English text together with the German text spoken by the second speaker 601 on the screen.

For example, referring to FIG. 7C, the electronic device 1000 may translate "Um die Ecke" 720 spoken by the second speaker 601 in English. Also, the electronic device 1000 may display the translated English text "Around the corner" 732 together with the German text "Um die Ecke" 731 spoken by the second speaker 601 on the screen.

Figure 8:
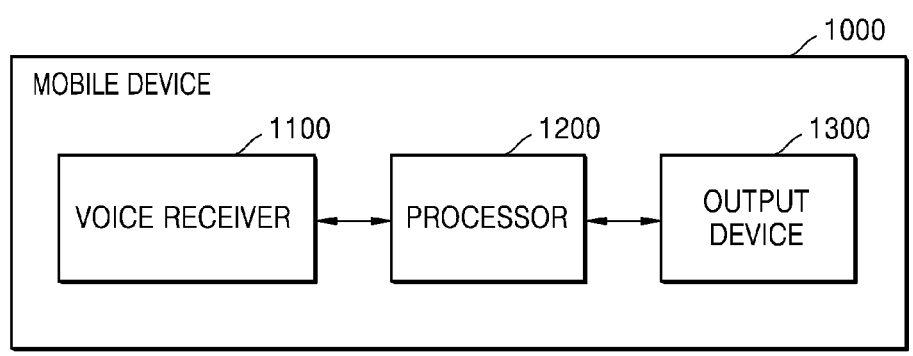
FIG. 8 is a block diagram of a structure of the electronic device according to an exemplary embodiment.

FIG. 8 is a block diagram of the electronic device 1000.

Referring to FIG. 8, the electronic device 1000 may include a voice receiver 1100; a processor 1200; and an output device 1300. In some exemplary embodiments, the electronic device 1000 may include more or less number of elements than those shown in FIG. 8.

Hereinafter, elements of the electronic device 1000 will be described.

The voice receiver 1100 receives a voice signal from the outside and processes the voice signal into electrical voice data. For example, the voice receiver 1100 may receive the voice signal from an external device or a speaker. The voice receiver 1100 may receive the voice signal and transfer the received voice signal to the processor 1200 so that translation may be performed in the processor 1200. Also, the voice receiver 1100 may use various noise removing algorithms to remove noise occurred during a process of receiving the voice signal from the outside. The voice receiver 1100 may include a microphone, or, for example, one or more microphones in some exemplary embodiments.

The processor 1200 may divide the voice signal received by the voice receiver into a plurality of voice segments. The processor 1200 may divide the voice signal into a plurality of voice segments in time frame units of predetermined lengths. Also, the processor 1200 may divide the voice signal into a plurality of voice segments so that adjacent voice segments may overlap each other.

The processor 1200 may determine an input language and a speaker of each of the voice segments and may determine a translation direction based on the determined input language and speaker of the voice segment. When the voice segment is spoken in the first language by the first speaker, the processor 1200 may determine a translation direction as the first direction, and when the voice segment is spoken in the second language by the second speaker, the processor 1200 may determine a translation direction as the second direction.

Also, when a difference between a possibility of the voice segment being spoken in the first language and a possibility of the voice segment being spoken in the second language is a critical value or lower, the processor 1200 may determine an input language of the voice segment based on the speaker of the voice segment. When a difference between a possibility of the voice segment being spoken in the first language and a possibility of the voice segment being spoken in the second language is a critical value or lower and the speaker of the voice segment is determined as the first speaker, the processor 1200 may determine an input language of the voice segment as the first language. Also, a difference between a possibility of the voice segment being spoken in the first language and a possibility of the voice segment being spoken in the second language is a critical value or lower and the speaker of the voice segment is determined as the second speaker, the processor 1200 may determine an input language of the voice segment as the second language.

When the voice segment is a voice segment that is spoken by the first speaker in the second language or by the second speaker in the first language, the processor 1200 may not translate the voice segment. The processor 1200 may translate the voice segments according to the determined translation direction and thus may generate the translation result.

The processor 1200 may be prepared into one or more processors in some exemplary embodiments and is a hardware processor executing a plurality of computer-executable instructions.

The output device 1300 may output the result of translation by the processor 1200.

The output device 1300 may include a display and/or a speaker. The output device 1300 may display the translation result as a text on a screen and/or as sound via the speaker. Also, the output device 1300 may rotate and display the text on the screen so that the speakers may easily check the translation result.

Figure 9:
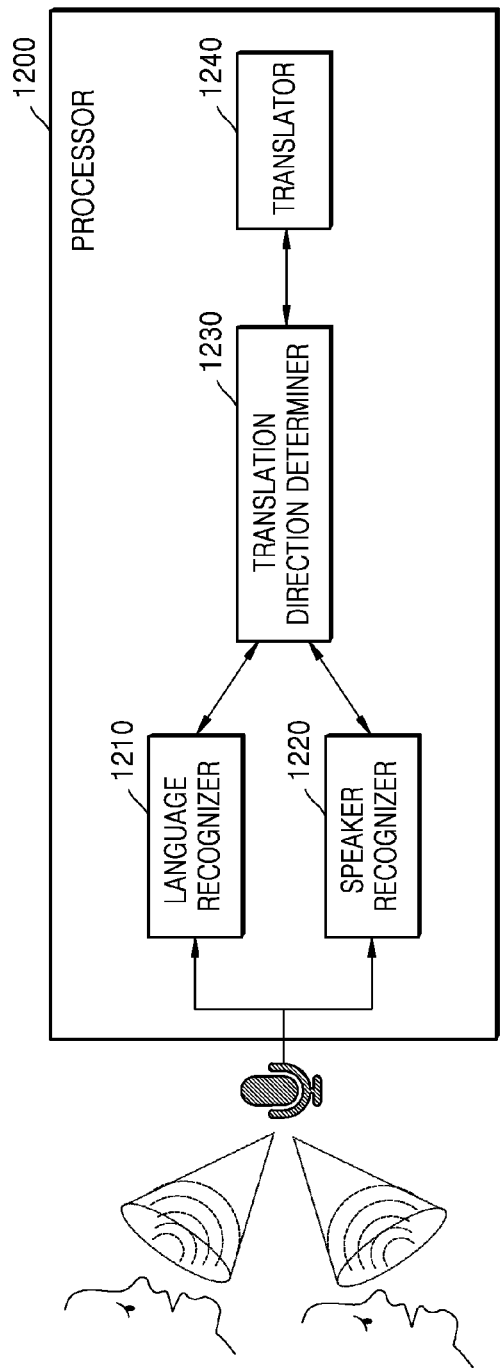
FIG. 9 is a block diagram of a structure of a processor according to an exemplary embodiment.

FIG. 9 is a block diagram of a structure of the processor 1200 according to an exemplary embodiment.

In one exemplary embodiment, the processor 1200 may include a language recognizer 1210, a speaker recognizer 1220, a translation direction determiner 1230, and a translator 1240.

The language recognizer 1210 may determine an input language of a plurality of voice segments by using various language recognition methods. The speaker recognizer 1220 may determine a speaker of a plurality of voice segments by using various speaker recognition methods. The translation direction determiner 1230 may determine a translation direction based on the input language and speaker of the voice segments determined by the language recognizer 1210 and the speaker recognizer 1220. The translation direction may include a first direction that translates the first language into the second language and a second direction that translates the second language into the first language, but embodiments are not limited thereto.

The translator 1240 may translate a voice signal according to the translation direction determined by the translation direction determiner 1230.

The processor 1200 may include a plurality of elements as shown in FIG. 9, but exemplary embodiments are not limited thereto. Thus, the processor 1200 may include more or less elements than those shown in FIG. 9.

Figure 10:
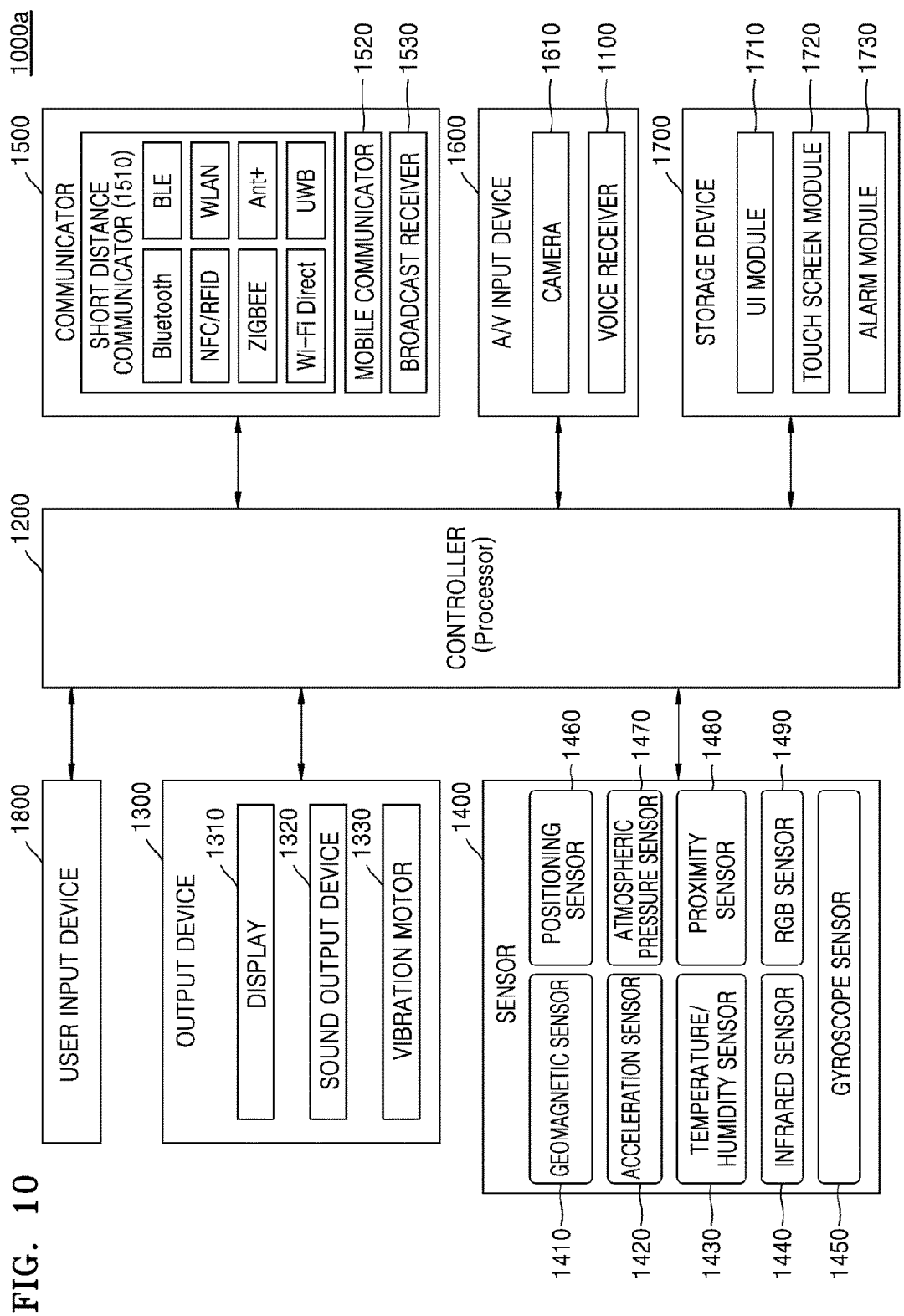
FIG. 10 is a block diagram of a structure of an electronic device according to another exemplary embodiment.

FIG. 10 is a block diagram of a structure of an electronic device 1000a according to another exemplary embodiment.

As shown in FIG. 10, the electronic device 1000a may further include a user input device 1800, a sensor 1400, a communicator 1500, an audio/video (A/V) input device 1600, and a storage device 1700 in addition to a voice receiver 1100, a processor 1200, and an output device 1300.

Descriptions of the voice receiver 1100, the processor 1200, and the output device 1300 provided in relation to FIG. 8 will be omitted from the description of FIG. 10.

The user input device 1800 denotes a device to input data for a user to control the electronic device 1000a. For example, the user input device 1800 may include a key pad, a dome switch, a touchpad (using a contact-type electrostatic capacitive method, a pressure-type resistance layer method, an infrared ray detection method, a surface ultrasonic wave propagation method, an integral strain gauge method, or a piezo effect method), a jog wheel, or a jog switch, but embodiments are not limited thereto.

The user input device 1800 may be an input device for controlling a setting related to a speech-to-speech translation function of the electronic device 1000a. For example, according to user preference, the user input device 1800 may set lengths of voice segments differently. In this regard, the user may reduce a calculation amount needed to perform the translation in consideration of a performance of the electronic device 1000a.

The output device 1300 may include a display 1319, a sound output device 1320, and a vibration motor 1330.

The display 1310 may display the translation result from the processor 1200 as a text. The display 1310 may include at least one selected from a liquid crystal display (LCD), a thin film transistor-liquid crystal display (TFT-LCD), an organic light-emitting diode (OLED), a flexible display, a 3-dimensional (3D) display, and an electrophoretic display. Also, in some embodiments, the electronic device 1000a may include at least two displays 1310.

The sound output device 1320 may output audio data that is received from the communicator 1500 or stored in the storage device 1700. Also, the sound output device 1320 outputs a sound signal related to a function of the electronic device 1000a (e.g., calling signal receiving sound, message receiving sound, or alarm). Also, the sound output device 1320 may output the translation result from the processor 1200 as sound. The sound output device 1320 may include a speaker or a buzzer.

The vibration motor 1330 may output a vibration signal. For example, the vibration motor 1330 may output a vibration signal that corresponds to outputting of audio data or video data (e.g., calling signal receiving sound or message receiving sound). Also, the vibration motor 1330 may output the vibration signal when a touch is received through a touch screen. Also, when the translation is completed in the processor or the translation result is output via the display 1310 or the sound output device 1320, the vibration motor 1330 may output the vibration signal at the same time.

The sensor 1400 may detect a status of the electronic device 1000a or a status around the electronic device 1000a and may send the detected information to the processor 1200.

The sensor 1400 may include at least one selected form a magnetic sensor 1410, an acceleration sensor 1420, a temperature/humidity sensor 1430, an infrared sensor 1440, a gyroscope sensor 1450, a position sensor (e.g., GPS) 1460, an atmospheric pressure sensor 1470, a proximity sensor 1480, and a RGB sensor (or, an illuminance sensor) 1490, but exemplary embodiments are not limited thereto. Functions of each of the sensors may be intuitively known by those of ordinary skill in the art from their names, and thus detailed descriptions thereof will be omitted herein.

The communicator 1500 may include at least one element that allows the electronic device 1000a to communicate with an external device. For example, the communicator 1500 may include a near field communicator 1510, a mobile communicator 1520, a broadcasting communicator 1530.

The near field communicator 1510 may include a Bluetooth communicator, a Bluetooth low energy (BLE) communicator, a short-range wireless communicator, a WLAN (wi-fi) communicator, a Zigbee communicator, an infrared data association (IrDA) communicator, a WFD (Wi-Fi direct) communicator, an ultra wideband (UWB) communicator, or an Ant+ communicator, but exemplary embodiments are not limited thereto.

The mobile communicator 1520 sends and receives a wireless signal with at least one of a base station, an external terminal, and a server. Here, the wireless signal may include a voice call signal, a video call signal, or various types of data according to sending/receiving text/multimedia messages.

The broadcasting communicator 1530 receives a broadcasting signal and/or information related to broadcasting from the outside through a broadcasting channel. The broadcasting channel may include satellite channels and terrestrial channels. In some exemplary embodiments, the electronic device 1000a may not include the broadcasting communicator 1530.

The A/V input device 1600 is configured to input an audio signal or a video signal, and may include a camera 1610 in addition to the voice receiver 1100.

The camera 1610 may obtain an image frame of a still image or a movie by an image sensor in a video call mode or a filming mode. An image captured by the image sensor may be processed by the processor 1200 or a separate image processor (not shown). The image frame processed in the camera 1610 may be stored in the storage device 1700 or may be sent to the outside via the communicator 1500. In some embodiments, the A/V input device 1600 may include at least two cameras 1610.

Also, the camera 1610 may be used to recognize a face of a speaker. The electronic device 1000a may recognize whether a speaker looking at the screen is a first speaker or a second speaker by analyzing a face image of the speaker received by the camera 1610. In this regard, the processor 1200 may accurately determine the speaker of a voice signal received via the voice receiver 1100.

The storage device 1700 may store a program for treating and controlling the processor 1200 and may store data that is input to the electronic device 1000a or output from the electronic device 1000a. For example, the storage device 1700 may store a registered speaker model and a universal background model (UBM).

In some embodiments, the storage device 1700 may include a module that includes one or more instructions which divides a voice signal from a speaker into a plurality of voice segments, determines input languages and speakers of the voice segments with respect to each of the plurality of the voice segments, determines a translation direction based on the determined input languages and speakers of the voice segments, translates the voice segments according to the determined translation direction, and controls an output device to output the translation results.

The storage device 1700 may include at least one type of storage medium selected from flash memory types, hard disk types, multimedia card micro types, card type memories (e.g., SD or XD memory), random access memory (RAM)

static random access memory (SRAM), read-only memory (ROM), electrically erasable programmable read-only memory (EEPROM), programmable read-only memory (PROM), magnetic memory, magnetic discs, and optical discs.

Programs stored in the storage device 1700 may be classified into a plurality of modules depending on their function. For example, the programs may be classified into a user interface (UI) module 1710, a touch screen module 1720, or an alarm module 1730.

The UI module 1710 may provide a UI or a graphical user interface (GUI) that is specialized to be interlocked with the electronic device 1000a according to its application. The touch screen module 1720 may detect a touch gesture of a user on a touch screen and may transmit the information about the touch gesture to the processor 1200. In some embodiments, the touch screen module 1720 may recognize and analyze a touch code. The touch screen module 1720 may include separate hardware that includes a controller.

The alarm module 1730 may generate a signal to inform about the occurrence of an event of the electronic device 1000a. Examples of an event occurring in the electronic device 1000a may include reception of a calling signal, message reception, a key signal input, or a schedule alarm. The alarm module 1730 may output the alarm signal in the form of a video signal, may output the alarm signal in the form of an audio signal via the sound output device 1320, or may output the alarm signal in the form of a vibration signal by using the vibration motor 1330.

Block diagrams of the electronic device 1000 or 1000a shown in FIGS. 8 and 10 are provided herein according to an exemplary embodiment. Each element of the block diagrams may be combined, added, or omitted according to the actual specification of the electronic device 1000 or 1000a. For example, two or more elements may be combined into one element, or one element may be divided into two or more elements according to the need. Also, a function performed in each block is provided for description of one or more exemplary embodiments, and the detailed operation or devices included therein should not limit the scope of the present disclosure.

Exemplary embodiments may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a compiler.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic device comprising:
a voice receiver;
a processor configured to:
   divide a voice signal, received by the voice receiver, into a plurality of voice segments,
   determine an input language based on the plurality of voice segments and a speaker that corresponds to each of the plurality of voice segments,
   determine a translation direction based on the determined input language and the determined speaker of the voice segments, and
   translate the plurality of voice segments based on the determined translation direction to generate a translation result; and
an output device configured to output the translation result,
wherein the processor is further configured to:
   in response to a determination that a first voice segment is spoken in a first language by a first speaker, determine the translation direction as a first direction, and
   in response to the determination that the first voice segment is spoken in a second language by a second speaker, determine the translation direction as a second direction,
wherein the first direction comprises a translation from the first language to the second language and the second direction comprises the translation from the second language to the first language, and
wherein, the processor is further configured to stop translating the first voice segment based on the determination that the first voice segment has been spoken by the first speaker in the second language or based on the determination that the first voice segment has been spoken in the first language by the second speaker.

2. The electronic device of claim 1, wherein, in response to a difference between a probability that the first voice segment is being spoken in the first language and the probability that the first voice segment is being spoken in the second language being equal to or lower than a threshold value, the processor is further configured to determine the input language of the first voice segment based on the determined speaker of the first voice segment.

3. The electronic device of claim 2, wherein, in response to the determined speaker of the first voice segment being the first speaker, the processor is further configured to determine the input language of the first voice segment as the first language, and, in response to the determined speaker of the first voice segment being the second speaker, the processor is further configured to determine the input language of the first voice segment as the second language.

4. The electronic device of claim 1, wherein the processor is further configured to divide the voice signal into the plurality of voice segments in a time frame of a predetermined length.

5. The electronic device of claim 4, wherein the processor is further configured to divide the voice signal into the plurality of voice segments so that adjacent voice segments from among the plurality of voice segments overlap each other.

6. The electronic device of claim 1, wherein the output device is further configured to rotate texts that show the translation result and display on a screen of the electronic device in response to completing the translation of the voice signal by the processor.

7. A method of voice translation, the method comprising:
receiving, by an electronic device, a voice signal;
dividing, by a processor, the voice signal into a plurality of voice segments;
determining an input language based on the plurality of voice segments and a speaker for each of the plurality of voice segments;
determining, by the processor, a translation direction based on the input language and the speaker for each of the plurality of voice segments;
translating the voice segments based on the determined translation direction to generate a translation result; and
outputting the translation result,
wherein the determining, by the processor, of the translation direction comprises:
in response to a first voice segment being spoken in a first language by a first speaker, determining the translation direction as a first direction; and
in response to the first voice segment being spoken in a second language by a second speaker, determining the translation direction as a second direction,
wherein the first direction comprises a translation from the first language to the second language and the second direction comprises the translation from the second language to the first language, and
wherein, stopping, by the processor, translating the first voice segment based on the determining by the processor that the first voice segment has been spoken by the first speaker in the second language or based on the determining by the processor that the first voice segment has been spoken in the first language by the second speaker.

8. The method of claim 7, wherein the determining of the input language and the speaker for the plurality of voice segments comprises:
determining a difference between a probability that the first voice segment is spoken in the first language and the probability that the first voice segment is spoken in the second language; and
in response to the determined difference being equal to or lower than a threshold value, determining an input language of the voice segment based on the speaker of the first voice segment.

9. The method of claim 8, wherein the determining of the input language and the speaker for the voice segments further comprises:

in response to the speaker of the first voice segment being determined to be the first speaker, determining the input language of the first voice segment as the first language; and
in response to the speaker of the first voice segment being determined to be the second speaker, determining the input language of the first voice segment as the second language.

10. The method of claim 7, wherein the dividing of the voice signal into the plurality of voice segments comprises dividing the voice signal into the plurality of voice segments in a time frame of a predetermined length.

11. The method of claim 10, wherein the dividing of the voice signal into the plurality of voice segments comprises dividing the voice signal into the plurality of voice segments so that adjacent voice segments from among the plurality of voice segments overlap each other.

12. The method of claim 7, wherein the outputting of the translation result comprises rotating and displaying a text showing the translation result on a screen when the translating of the voice signal is completed.

13. A non-transitory computer readable storage medium having recorded thereon a program for executing the method of claim 7.

14. The method of claim 7, wherein the determining the input language comprises:
determining the input language of at least two adjacent voice segments from among the plurality of voice segments based on a language recognition method comprising at least one of a deep neural network method, an I-vector method, universal phoneme decoder, and shifted delta cepstrum;
calculating a score for each of the at least two adjacent voice segments; and
determining the input language of a respective voice segment based on the calculated scores of the at least two adjacent voice segments, and
wherein the determining the speaker of the respective voice segment comprises:
generating a speaker model based on the at least two adjacent voice segments from among the plurality of voice segments,
calculating a score based on comparing the generated speaker model to a plurality of speaker models stored in a memory, and
selecting a speaker model from among the plurality of speaker models based on the calculated score,
wherein the selected speaker model represents the speaker of the voice signal.

* * * * *